US009280971B2

(12) United States Patent
McLean

(10) Patent No.: US 9,280,971 B2
(45) Date of Patent: Mar. 8, 2016

(54) MOBILE WIRELESS COMMUNICATIONS DEVICE WITH SPEECH TO TEXT CONVERSION AND RELATED METHODS

(75) Inventor: Jennawae McLean, Kitchener (CA)

(73) Assignee: BlackBerry Limited, Waterloo (CA)

( * ) Notice: Subject to any disclaimer, the term of this patent is extended or adjusted under 35 U.S.C. 154(b) by 1976 days.

(21) Appl. No.: 12/394,352

(22) Filed: Feb. 27, 2009

(65) Prior Publication Data

US 2010/0223055 A1 Sep. 2, 2010

(51) Int. Cl.
*G10L 15/26* (2006.01)
*H04M 1/725* (2006.01)

(52) U.S. Cl.
CPC ............ *G10L 15/26* (2013.01); *H04M 1/72552* (2013.01); *H04M 2201/40* (2013.01); *H04M 2250/74* (2013.01)

(58) Field of Classification Search
CPC ........ G10L 15/26; G10L 15/265; G10L 15/01
USPC .................................................. 704/235, 251
See application file for complete search history.

(56) References Cited

U.S. PATENT DOCUMENTS

| | | | | |
|---|---|---|---|---|
| 6,895,257 | B2 | 5/2005 | Boman et al. | 455/563 |
| 7,260,529 | B1 | 8/2007 | Lengen | 704/235 |
| 7,286,987 | B2 | 10/2007 | Roy | 704/270 |
| 7,457,751 | B2 | 11/2008 | Shostak | 704/251 |
| 2004/0097264 | A1 | 5/2004 | Bodnar et al. | 455/556.1 |
| 2005/0131687 | A1 | 6/2005 | Sorrentino | 455/552.1 |
| 2007/0038452 | A1* | 2/2007 | Blair | G10L 15/26 704/257 |
| 2007/0100619 | A1 | 5/2007 | Purho | 704/239 |
| 2007/0182595 | A1 | 8/2007 | Ghasabian | 341/22 |
| 2009/0089057 | A1* | 4/2009 | Batot et al. | 704/251 |
| 2009/0306980 | A1* | 12/2009 | Shin | 704/235 |
| 2009/0326938 | A1* | 12/2009 | Marila et al. | 704/235 |
| 2010/0113073 | A1* | 5/2010 | Schlesener et al. | 455/466 |

FOREIGN PATENT DOCUMENTS

GB 2443461 5/2008 ............... H04Q 7/22

OTHER PUBLICATIONS

Chanod et al., "Coupling an Automatic Dictation System With a Grammar Checker", *Proc. of Coling-92*, Nantes, Aug. 23-28, 1992, pp. 940-944.
iLane, http://www.ilane.com/what.shtml, downloaded on Jan. 2, 2009, 1 page.

(Continued)

*Primary Examiner* — Richemond Dorvil
*Assistant Examiner* — Mark Villena
(74) *Attorney, Agent, or Firm* — Jenna L. Wilson; Dimock Stratton LLP (firm)

(57) ABSTRACT

A mobile wireless communications device may include a housing and a wireless transceiver carried by the housing. The mobile wireless communications device may also include audio transducer carried by the housing, and a controller cooperating with the wireless transceiver to perform at least one wireless communications function. The controller may also cooperate with the at least one audio transducer to convert speech input through the audio transducer to converted text, determine a proposed modification for the converted text, and output from the audio output transducer the proposed modification for the converted text.

15 Claims, 6 Drawing Sheets

(56) References Cited

OTHER PUBLICATIONS

Nuance Voice Control—Key Features, http://www.nuance.com/voicecontrol/features.asp, downloaded on Dec. 31, 2008, 2 pages.
Nuance—Dragon NaturallySpeaking Solutions, http://www.nuance.com/naturallyspeaking/products/default.asp, downloaded on Dec. 31, 2008, 1 page.
The Vlingo User Guide, Version 2.0, 2008 vlingo Corporation, Printed Oct. 2008, pp. 1-32.
Nuance Voice Control, "Two Thumbs Up", http://www.nuance.com/mobileworldcongress2008/datasheets/nuance_voice_control.pdf, downloaded on Dec. 31, 2008, 1 page.
Nuance Dragon "Dragon Naturally Speaking/Dragon Medical, User Guide" http://www.nuance.com/naturallyspeaking/resources/documents/DNS10UserGuide.pdf, downloaded on Oct. 9, 2009, pp. 1-131.
Michael Arrington, TellMe Launches a Killer Mobile Product; Jan. 23, 2007, pp. 1-11.
Harry Medved et al, Fandango and Microsoft's Tellme to Launch Voice-Activated Mobile Application for Movie Information, Apr. 23, 2008, pp. 1-2.
NCH Swift Sound, Dial Dictate Telephone Dictation System, Apr. 9, 2001, pp. 1-3.

* cited by examiner

MOBILE WIRELESS COMMUNICATIONS DEVICE WITH SPEECH TO TEXT CONVERSION AND RELATED METHODS

TECHNICAL FIELD

The present disclosure relates to the field of wireless communications, and, more particularly, to mobile wireless communications devices with speech conversion and related methods.

BACKGROUND

Some people suffer from poor eyesight or a disability of the eyes. As a result a person may not be able to clearly see a keypad or a display of a mobile wireless communications device. Thus, operating the mobile wireless communications device may be difficult, for example, such when attempting to read the display, or manually enter text or commands.

Moreover, many motor vehicle accidents occur as a result of a driver operating a motor vehicle and mobile wireless communications device at a same time. A motor vehicle driver may easily have their eyes distracted from a roadway to read the display or type a message on the keypad.

DETAILED DESCRIPTION OF THE PREFERRED EMBODIMENTS

Figure 1:
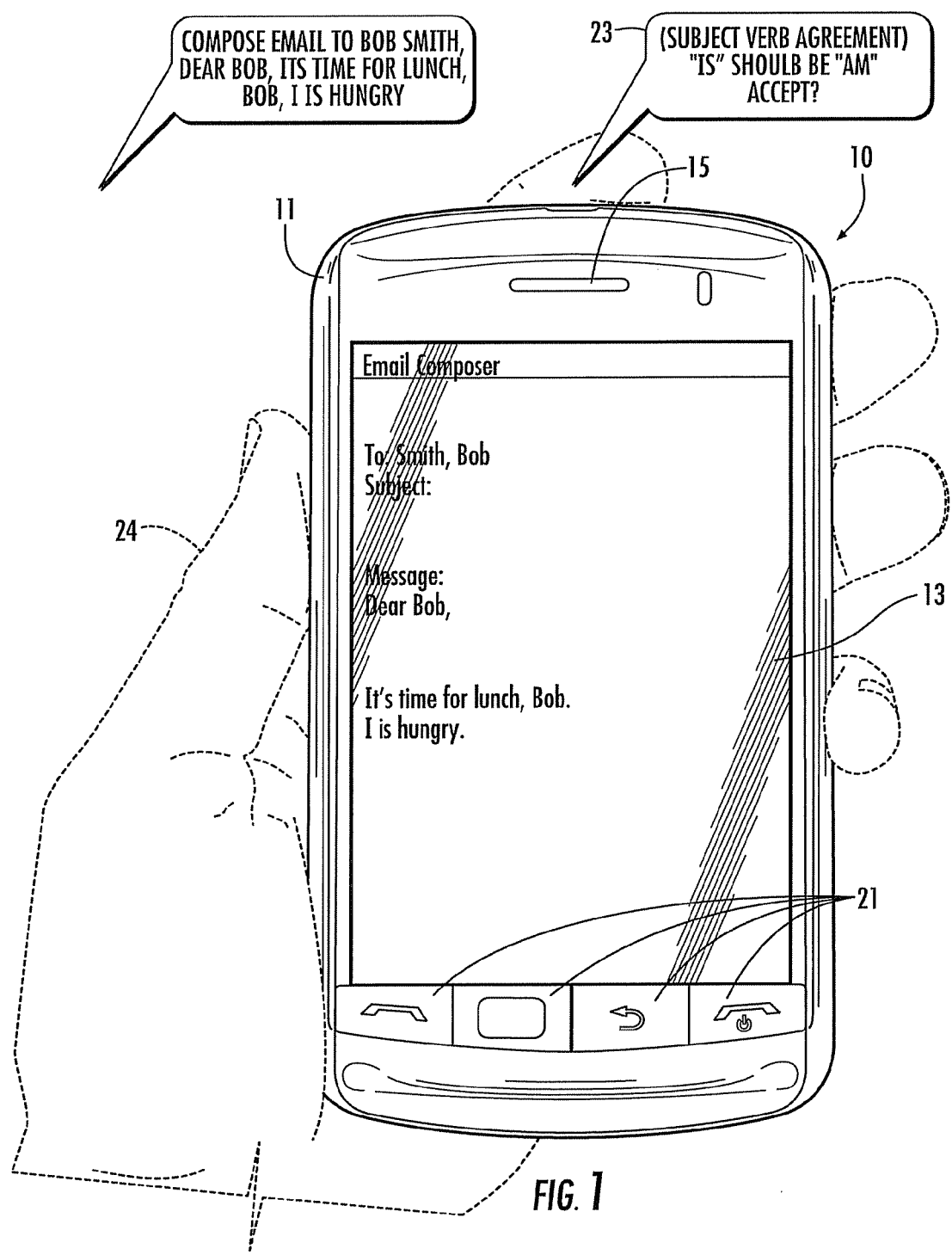
FIG. 1 is a plan view of a mobile wireless communications device illustrating converted text and a proposed modification according to an example embodiment of the present disclosure.

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Like numbers refer to like elements throughout.

Mobile communications devices have become an integral part of society over the last two decades. Indeed, more than eighty-two percent of Americans own a mobile communications device, for example, a cell phone device. Even further, international cell phone device penetration has reached 3.3 billion units. In other words, approximately half the world's population has a cell phone device. The typical cell phone device includes an antenna, and a transceiver coupled to the antenna. The transceiver and the antenna cooperate to transmit and receive communications signals with a network infrastructure, usually maintained by a cell phone provider.

Although the first cell phone devices typically included only voice or limited short message service capabilities, the capabilities of cell phone devices have increased greatly over the last decade. More so, the typical "smart phone," i.e. a cell phone device with advanced capabilities, rivals the processing power and memory of desktop personal computers of a decade earlier. For example, the typical smart phone is capable of running a variety of advanced programs spanning from typical word processing software to global positioning system navigation software.

As the capabilities of cell phone devices have increased, cell phone providers have gained access to new potential revenues streams. For example, cell phone providers sell multimedia content to their subscribers. More specifically, the cell phone providers typically sell ring tones and digital music files via the cell phone. The cell phone providers charge small fees for each transaction, which is separate from the typical monthly subscription fee.

Another recently developed potential revenue stream is the sale of third party applications for the cell phone devices. In other words, the cell phone providers provide a venue for third parties to sell their software to subscribers. Of course, the cell phone providers typically derive a fee from the third parties for providing the venue. A particularly advantageous venue for these third party applications is the so-called mobile application store platform. For example, the Application Center of Research In Motion Limited, the assignee of the present application, provides an on-device platform for third party applications. Because of the easy access to a plurality of third party applications and the capability of paying for such applications wirelessly via the cell phone subscriber's account, the mobile application store platform provides a robust consumer solution with great potential for large revenue.

A mobile wireless communications device may include a housing and a wireless transceiver carried by the housing. The mobile wireless communications device may also include at least one audio transducer carried by the housing and a controller cooperating with the wireless transceiver to perform at least one wireless communications function. The controller may also cooperate with the at least one audio transducer to convert speech input through the at least one audio transducer to converted text and determine a proposed modification for the converted text, for example. The controller may also output from the at least one audio output transducer the proposed modification for the converted text.

The proposed modification may also include a proposed grammar correction. The proposed modification may also include a proposed ambiguity resolution, for example.

The controller may also cooperate with the at least one audio transducer to accept or reject the proposed modification for the converted text based upon a further speech input. The controller may also cooperate with the at least one audio transducer to selectively play back the converted text, for example. The controller also may cooperate with the wireless transceiver to wirelessly transmit the converted text.

The mobile wireless communications device according may further include a memory. The controller may also cooperate with the memory to store the converted text, for example. The memory may also be coupled to the controller for storing text modification rules. The controller may also cooperate with the at least one audio transducer to be responsive to spoken commands.

Another aspect is directed to a method of upgrading a mobile wireless communications device that may include a housing, a wireless transceiver carried by the housing, at least one audio transducer carried by the housing, and a controller cooperating with the wireless transceiver to perform at least one wireless communications function. The method may include configuring the controller to cooperate with the at least one audio transducer to convert speech input through the at least one audio transducer to converted text, for example. The method may also include configuring the controller to cooperate with the at least one audio transducer to determine a proposed modification for the converted text, and output from the at least one audio transducer the proposed modification for the converted text to thereby upgrade the mobile wireless communications device.

Referring initially to FIG. 1, a user 24, for example, that may have impaired vision, is illustratively holding a mobile wireless communications device 10. The mobile wireless communications device 10 converts speech to commands and text and determines proposed modifications for the converted text. Converting speech of a user 24 to commands and text and providing proposed modifications thereto may be particularly advantageous for reducing reliance on vision for operating the mobile wireless communications device 10. Of course, as will be appreciated by those skilled in the art, the user 24 may not suffer from impaired vision benefit from the mobile wireless communications device 10 that converts speech to commands and text and determines proposed modifications for the converted text. Indeed, the mobile wireless communications device 10 may also be useful for other applications, such as using the mobile wireless communications device while driving a vehicle, for example.

Figure 2:
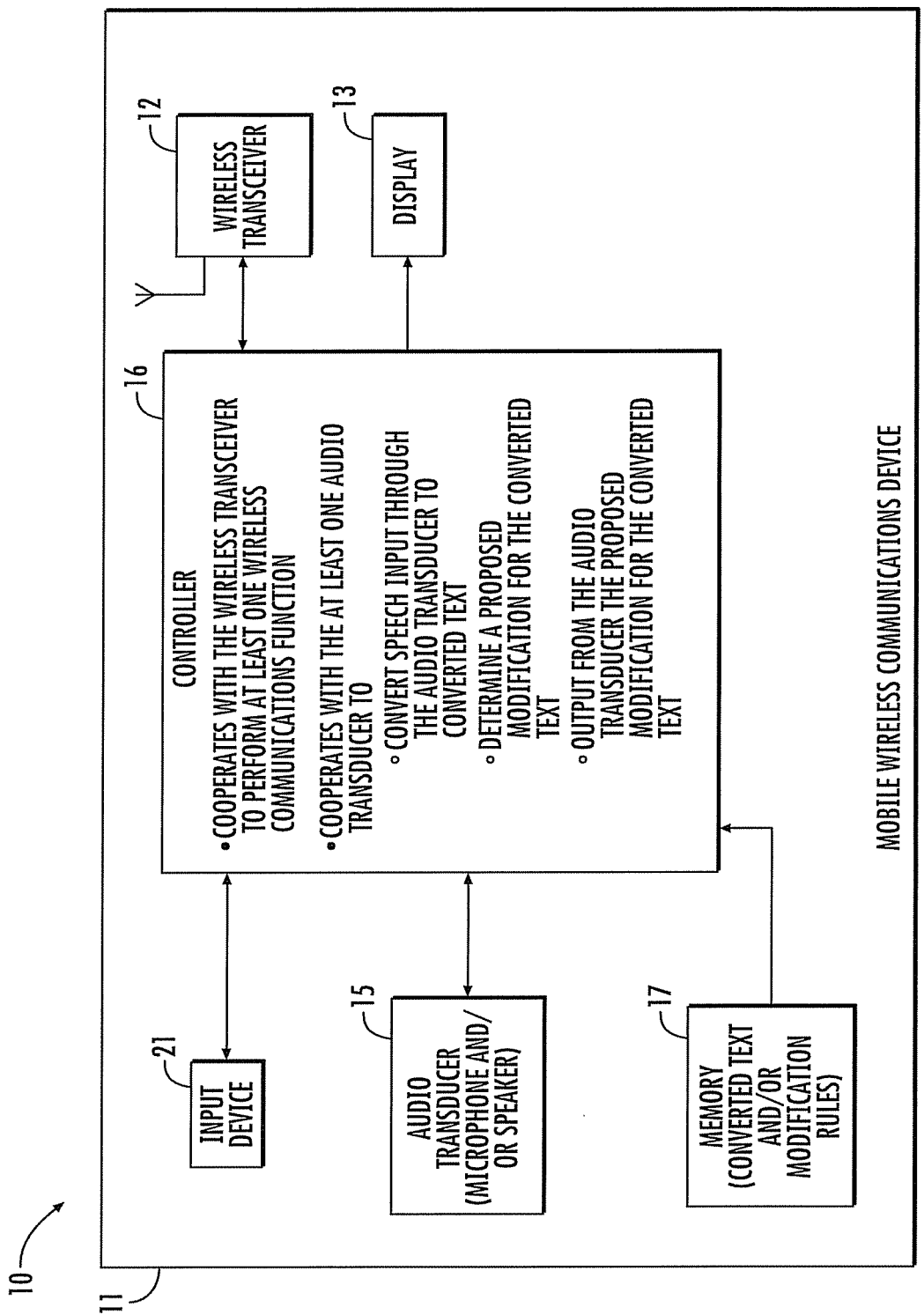
FIG. 2 is schematic block diagram of the mobile wireless communications device of FIG. 1, according to an example embodiment.

Referring now additionally to FIG. 2, the mobile wireless communications device 10 is now described in greater detail. The mobile wireless communications device 10 illustratively includes a housing 11, a wireless transceiver 12 carried by the housing, and a display 13 carried by the housing.

The mobile wireless communications device 10 also illustratively includes an audio transducer 15 carried by the housing 11. The audio transducer 15 may be a microphone, for example. The audio transducer 15 may also be a speaker. In some example embodiments, there may be more than one audio transducer 15, for example, a microphone and speaker may be used and carried by the housing 11.

The mobile wireless communications device 10 includes one or more input devices 21. The input devices 21 illustratively include push buttons for cooperating with the controller 16 to selectively enable the speech conversion and proposed modification determination. In some example embodiments, the input device 21 may be an alphanumeric keypad or other input device for cooperating with the controller 16 to selectively enable the speech conversion and proposed modification determination, for example. Still further, an input device 21 may be coupled to the display 13 to accept a touching input therefrom and cooperate with the controller 16 to selectively enable the speech conversion and proposed modification determination, for example.

A controller 16 is also carried by the housing 11 and cooperates with the wireless transceiver 12 to perform at least one mobile wireless communications function. For example, the wireless transceiver 12 may be a cellular transceiver or a WiFi transceiver, for example, and may cooperate with the controller 16 to communicate data and/or voice communications. Other types of wireless transceivers and mobile wireless communications functions will be appreciated by those skilled in the art.

The controller 16 also cooperates with the audio transducer 15 to be responsive to spoken commands. A user 24 may speak a command that would otherwise correspond to one or more of the input devices 21. For example, as illustrated, a user 24 may wish to compose an email, and thus may speak "compose email" to open the mail program to a mail composition screen. Other spoken commands may correspond to a different user program, or to a different function in a particular user program. For example, commands may include "reply," or "send," for example. Other commands may relate to a wireless communications function, for example, "call" to initiate a phone call.

The controller 16 also may also convert speech to a corresponding contact list name for use in conjunction with a spoken command. The controller 16 may execute that command with contact information corresponding to the command. For example, "call Bob Smith" may initiate a phone call to Bob Smith based on the phone number listing of Bob Smith in the contact list. Similarly, as illustrated, "compose email to Bob Smith" may open a compose email screen with the "to" field having email contact information for Bob Smith based upon the contact list. As will be appreciated by those skilled in the art, different commands may correspond to different functions, and the controller 16 and audio transducer 15 may cooperate to selectively program spoken commands from the user 24. It will be appreciated by those skilled in the art that the controller 16 cooperates with the audio transducer 15 to be responsive to spoken commands using known techniques, for example as may be disclosed in background.

The controller 16 also cooperates with the audio transducer 15 to convert speech input through the audio transducer to converted text 22. As will be appreciated by those skilled in the art, the controller 16 may cooperate with the audio transducer 15 using known speech to text techniques, for example, as disclosed in DialDictate from NCH Software of Australia, "Coupling an Automatic Dictation System With a Grammar Checker" by Chanod et al., ILane, available from Intelligent Mechatronic Systems Inc. of Waterloo, Ontario, Canada, U.S. Pat. No. 7,260,529 to Lengen, Nuance Voice Control available from Nuance Communications, Inc. of Burlington, Mass., Dragon Naturally Speaking 10, also available from Nuance Communications, Inc. of Burlington, Mass., Vlingo, available from Vlingo Corporation of Cambridge, Mass., U.S. Pat. No. 7,457,751 to Shostak, U.S. Pat. No. 7,286,987 to Roy, and U.S. Publication No. 2007/0182595 to Ghasabian, the entire contents of each of which are herein incorporated by reference.

DialDictate from NCH Software of Australia lets one call in dictation, that is, convert speech to text and send the text via email, or a computer network. Recording, replaying, editing, and file management are controlled by pressing numbers on the telephone keypad. When a recording is completed, DialDictate sends the dictation for transcription by email, the local computer, network or via the Internet. For example, a user could dictate using a hands-free speakerphone or a cordless headset in an office, car phone, cell phone, a VoIP softphone, or even a payphone overseas.

The article entitled "Coupling an Automatic Dictation System With a Grammar Checker" by Chanod et al. discloses a system that includes an automatic dictation system (ADS) that is coupled with a syntactic parser. A voice signal is submitted to a signal processor to extract acoustic parameters therefrom. A decoding operation determines possible spoken words from the voice signal. Grammatical analysis is performed after a decoding by using the syntactic parser to determine grammar composition of a sentence input. The ADS system is implemented on a personal computer.

ILane, available from Intelligent Mechatronic Systems Inc. of Waterloo, Ontario, Canada, is a portable device that lets a user control his smartphone using simple voice commands when inside a vehicle. The iLane device allows a user to open, listen to, and respond to email entirely hands-free simply by speaking aloud. iLane verbally notifies the user when new emails arrive on the smartphone and reads emails out loud, on command. If a user wishes to respond to an email, the user says "Reply" and composes his response by speaking aloud. iLane hears the user, and sends the message to the recipient from the smartphone. Additionally, iLane allows a user to access and control other smartphone applications by voice command, including managing phone calls, SMS messages, and calendar.

U.S. Pat. No. 7,260,529 to Lengen discloses a command insertion system and a method for voice recognition. More particularly, a speech recognition system operates a speech recognition application on a computer in a continuous dictation mode. A separate keypad is coupled to the computer through a USB port. The keypad includes a plurality of keys for providing command signals representative of a desired computer operation command, which override the dictation mode of the speech recognition application whenever such a command is operated. This allows the user to insert commands, such as punctuation, numerals, "next line", "next paragraph", and the like, directly from the keypad while maintaining operation of the voice recognition application in its continuous dictation mode.

Nuance Voice Control available from Nuance Communications, Inc. of Burlington, Mass., is directed to a voice command system for a wireless communications device. More particularly, the voice command system allows a user to execute commands on the wireless communications device, for example, call a telephone book entry, email from contacts, including compose an email, and view the web. Punctuation is provided by spoken commands, for example "period" or "new line."

Dragon Naturally Speaking 10, also available from Nuance Communications, Inc. of Burlington, Mass., is speech recognition software for a personal computer. The software allows programs to be started and documents to be created from speaking. The software inserts natural punctuation marks, i.e. periods and commas. Other punctuation needs to be spoken.

Vlingo, available from Vlingo Corporation of Cambridge, Mass., is software that allows a user to speak voice commands on a BlackBerry device instead of typing. More particularly, the software allows sending of email and text messages, making phone calls, writing a note, and opening other applications. The software learns a user's voice and improves accuracy with use. Punctuation is spoken, and capitalization is automatic after a spoken "period." Additionally, the software speaks the user's request back to the user and a user may specify the speak back voice as a male or female.

U.S. Pat. No. 7,457,751 to Shostak discloses a system for improving recognition accuracy in speech recognition applications. The system includes a controlling computer that runs speech recognition software and a customer configuration database. The system also includes badges, which are wearable wireless devices that users employ to communicate with each other. Voice commands received through the badge are interpreted and a set of voice command interpretations are generated.

U.S. Pat. No. 7,286,987 to Roy discloses a speech recognition system interpreting human speech received via a cell phone, for example, to improve accuracy or automatically generate punctuation for transcription and dictation. Roy categorizes words in phrases, as for example, nouns and verbs. Punctuation may be generated in the dictated speech without a speaker explicitly dictating punctuation. A response to the spoken words, for example, if a command is given, may be spoken or visual.

U.S. Publication No. 2007/0182595 to Ghasabian discloses an electronic device that enhances data entry in a mobile and fixed environment. More particularly, a user may use voice/speech to enter a desired symbol without other interaction, such as pressing a key. The system may correct, add, or replace words to provide an error-free phrase that have been entered by the user.

The converted text 22 may be displayed on the display 13. The controller 16 also determines a proposed modification 23 for the converted text 22. The proposed modification 23 may be a proposed grammar correction or may be a proposed ambiguity resolution and may also be displayed on the display 13 and/or identified as an ambiguity. For example, the proposed modification 23 may be a subject-verb agreement, as illustrated in FIG. 1. The proposed modification 23 may also be a missing comma, or a missing apostrophe, for example.

As illustrated more particularly in FIG. 1, the controller 16 may cooperate with the audio transducer 15 to audibly speak the proposed modification 23 to the converted speech 22. For example, as illustrated, an audible voice identifies the potential ambiguity or grammar to be modified. The controller 16 cooperates with the audio transducer 15 to audibly propose the modification 23 for correcting the grammar or resolving the ambiguity.

Figure 3:
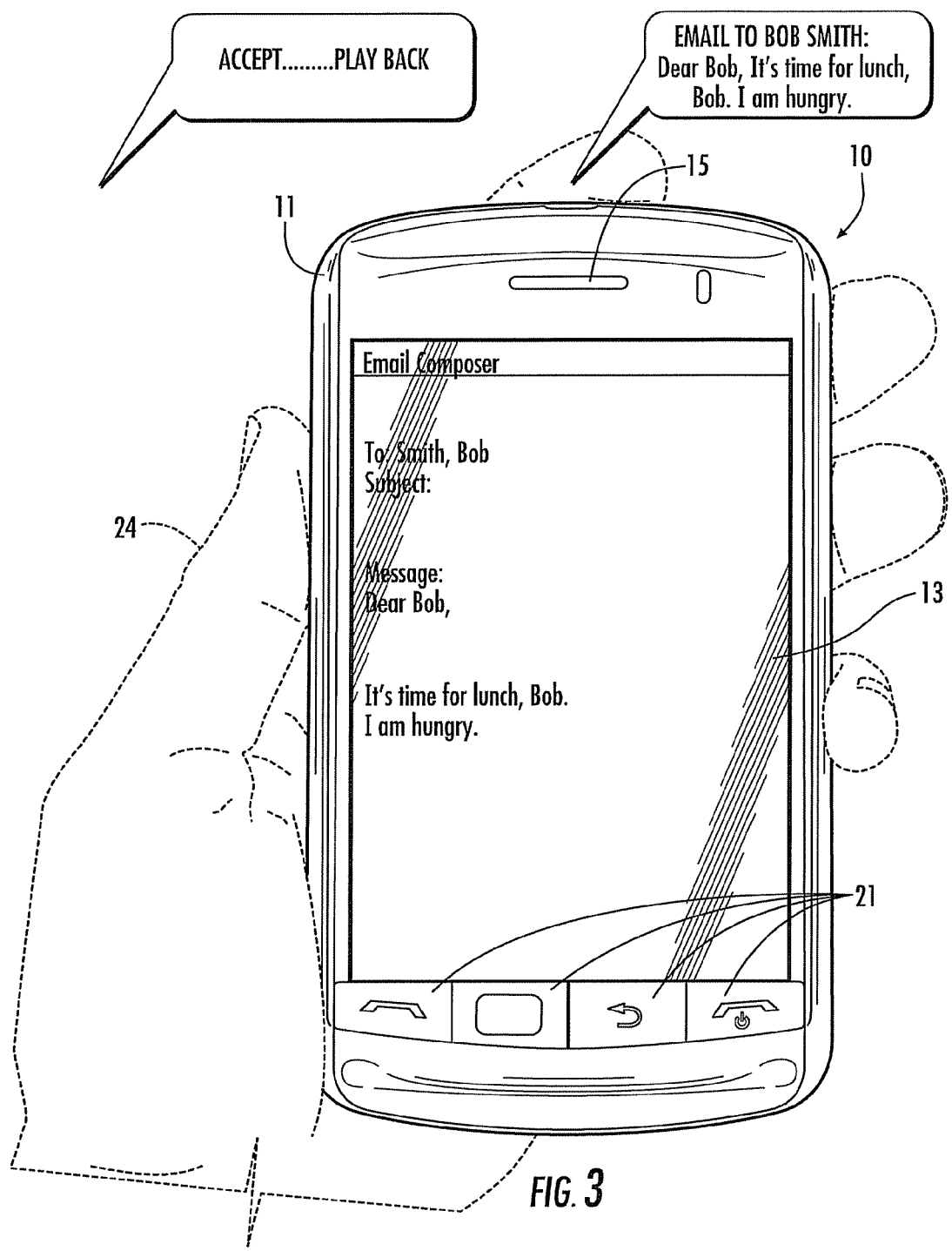
FIG. 3 is a plan view of the mobile wireless communications device shown in FIG. 1 illustrating play back of accepted modified converted text, according to an example embodiment.

Referring now additionally to FIG. 3, the controller 16 and the audio transducer 15 cooperate to accept or reject the proposed modification 23. For example, as illustrated in FIG. 3, the user 24 speaks "accept" or "reject" to accept or reject respectively, each proposed modification 23. Other commands may be spoken by the user 24 to accept or reject a proposed modification 23. Based upon the user's response, the proposed modification 23 may or may not be made in the converted text 22. The converted text 22 including the accepted proposed modifications 23 may be displayed on the display 13.

In some example embodiments, the proposed modification 23 may be automatically inserted into the converted text 22, for example, periods, commas, and apostrophes may be added, and certain words may be capitalized without accepting or rejecting each proposed modification.

The controller 16 also illustratively may cooperate with the audio transducer 15 to selectively play back the converted text 22. For example, as illustrated more particularly in FIG. 3, the user 24 may speak a command, such as "play back." In response to the user's spoken command, the controller 16 cooperates with the audio transducer 15 to audibly play the converted text 22. The converted text 22 played back may include accepted and/or rejected proposed modifications 22. Still further, the text may be played back in a male or female voice and/or in different languages, as will be appreciated by those skilled in the art. Moreover, in some example embodiments, the controller 16 may also cooperate with the audio transducer 15 to audibly read or play incoming or received messages, for example, voicemail, email or short messaging service (SMS) messages.

Figure 4:
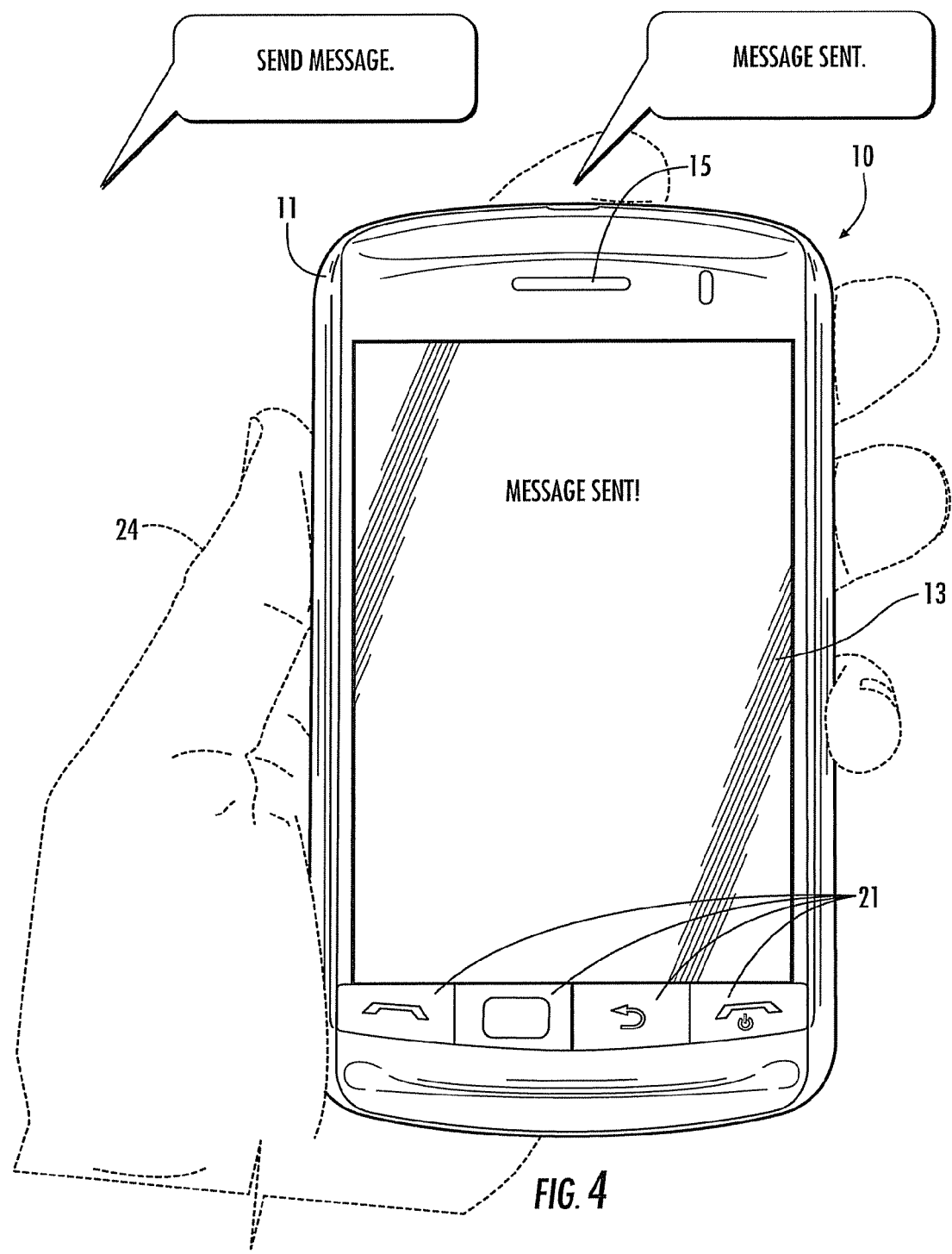
FIG. 4 is a plan view of the mobile wireless communications device and user of FIG. 3 illustrating wireless transmission of the converted text, according to an example embodiment.

Referring now additionally to FIG. 4, after the proposed modifications in the converted text 22 have been accepted and/or rejected, the user 24 may speak the command "send," for example. The "send" command may cause the controller 16 to cooperate with the wireless transceiver 12 to wirelessly transmit the converted text 22 including accepted and/or rejected proposed modifications 23. For example, the converted text 22 may be sent to the intended recipient, for example, Bob Smith, as illustrated.

As illustrated more particularly in FIG. 2, the mobile wireless communications device 10 illustratively includes a memory 17, for example, an on-board/on-chip memory or a removable memory card or both. As will be appreciated by those skilled in the art, the memory 17 may store converted text and/or commands. The memory 17 may also store text modification rules. For example, the memory 17 may store spelling rules, such as a dictionary, punctuation rules, such as comma usage, and capitalization rules, such as capitalization of a proper noun. Other grammar rules, such as subject-verb agreement, may also be stored in the memory 17. Still further, as will be appreciated by those skilled in the art, the memory 17 may store text modification rules for different languages, contacts or address book information, and voices for audible responses or play back.

The memory 17 may also store computer executable code for being executed by the controller 16. In some example embodiments, the computer executable code may be written in Java, for example. Additionally, the computer executable code may be stored on other storage mediums, as will be appreciated by those skilled in the art.

Figure 5:
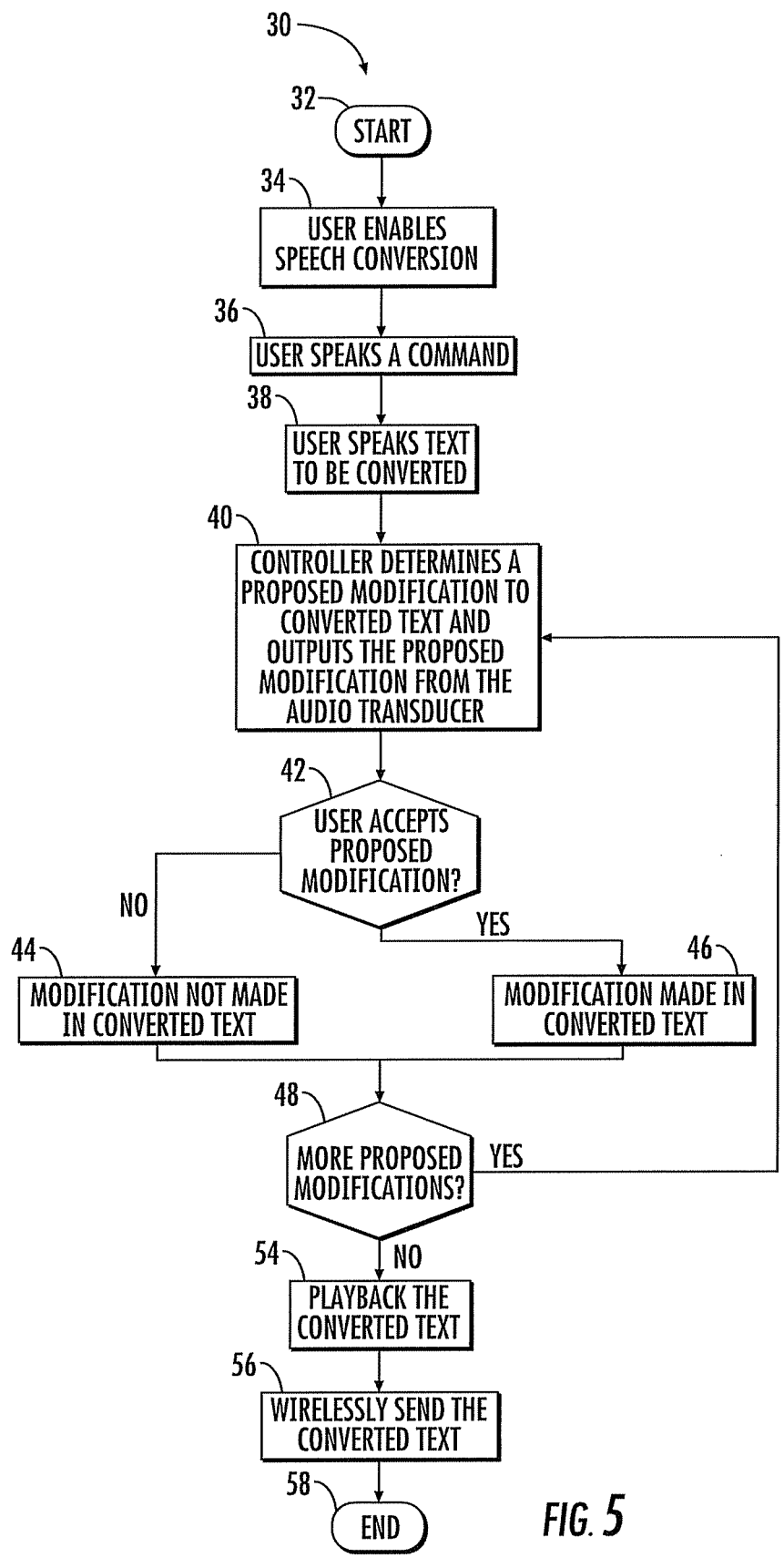
FIG. 5 is a flowchart illustrating the use of the mobile wireless communications device of FIG. 1 for speed to text conversion, according to an example embodiment.

Referring now additionally to the flowchart 30 of FIG. 5, the process of using the mobile wireless communications device including speech conversion begins at Block 32. The user 24, at Block 34, uses one or more of the input devices 21 to configure the controller 16 to selectively enable the conversion of speech to commands and text. Once enabled, the user 24 speaks a command (Block 36). The user 24, at Block 38, speaks the text to be converted. The controller 16 determines a proposed modification to the converted text 22 (Block 40). The user 24 accepts or denies each proposed modification 23 (Block 42). If the proposed modification 23 is accepted the proposed modification is made in the converted text 22 (Block 46). Alternatively, if the proposed modification 23 is rejected by the user 24, the proposed modification is not made in the converted text 22 (Block 44). If more than one proposed modification 23 exists in the converted text (Block 48), the user 24 is prompted to accept or reject each proposed modification. If each proposed modification 23 has been accepted or rejected, the user may initiate an audible playback of the converted text 22 at Block 54. The converted text including the modifications may be wireless transmitted at Block 56 before ending at Block 58.

Another aspect is directed to a method of upgrading a mobile wireless communications device 10 that includes a housing 11, a wireless transceiver 12 carried by the housing, an audio transducer 15 carried by the housing, and a controller 16 cooperating with the wireless transceiver to perform at least one wireless communications function. The method includes configuring the controller 16 to cooperate with the at least one audio transducer 15 to convert speech input through the audio transducer to converted text 22, for example. The method also includes configuring the controller 16 to cooperate with the audio transducer 15 to determine a proposed modification 23 for the converted text 22, and output from the at least one audio transducer the proposed modification for the converted text to thereby upgrade the mobile wireless communications device 10.

Configuring the controller 16 may include accessing stored computer executable code from the memory 17, such as a Java application program interface (API), for example. Of course, as will be appreciated by those skilled in the art, configuring the controller 16 may occur by the installation of the computer executable code into the memory 17. For example, the controller 16 may be configured by downloading the computer executable code from a third party, or the manufacturer. The controller 16 may also be configured by receiving pushed computer executable code from the third party or the manufacturer. Using one or more of the input devices 21 also configures the controller 16 to selectively enable the conversion of speech to commands and text and determines proposed modifications for the converted text.

As will be appreciated by those skilled in the art, the mobile wireless communications device 10 that converts speech to commands and text 22 and determines proposed modifications 23 for the converted text advantageously reduces strain on the user's eyes and fingers. Indeed, a user 24 may not have to read and type messages on the mobile wireless communications device 10. The mobile wireless communications device 10 also may increase the user's efficiency by reducing the time taken to write, edit, and/or send messages. Still further, when driving a motor vehicle, a user 24 may not have to glance at the display 13 or use one of the input devices 21 of the mobile wireless communications device 10 to perform a communications function, such as placing a phone call or drafting an email, for example.

Example components of a hand-held mobile wireless communications device 1000 that may be used in accordance with the present disclosure are further described in the example below with reference to FIG. 6. The device 1000 illustratively includes a housing 1200, a keypad 1400 and an output device 1600. The output device shown is a display 1600, which may comprise a full graphic LCD. In some example embodiments, display 1600 may comprise a touch-sensitive input and output device. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some example embodiments, keypad 1400 may comprise a physical keypad or a virtual keypad (e.g., using a touch-sensitive interface) or both.

The housing 1200 may be elongated vertically, or may take on other sizes and shapes (including clamshell housing structures). The keypad 1400 may include a mode selection key, or other hardware or software for switching between text entry and telephony entry.

Figure 6:
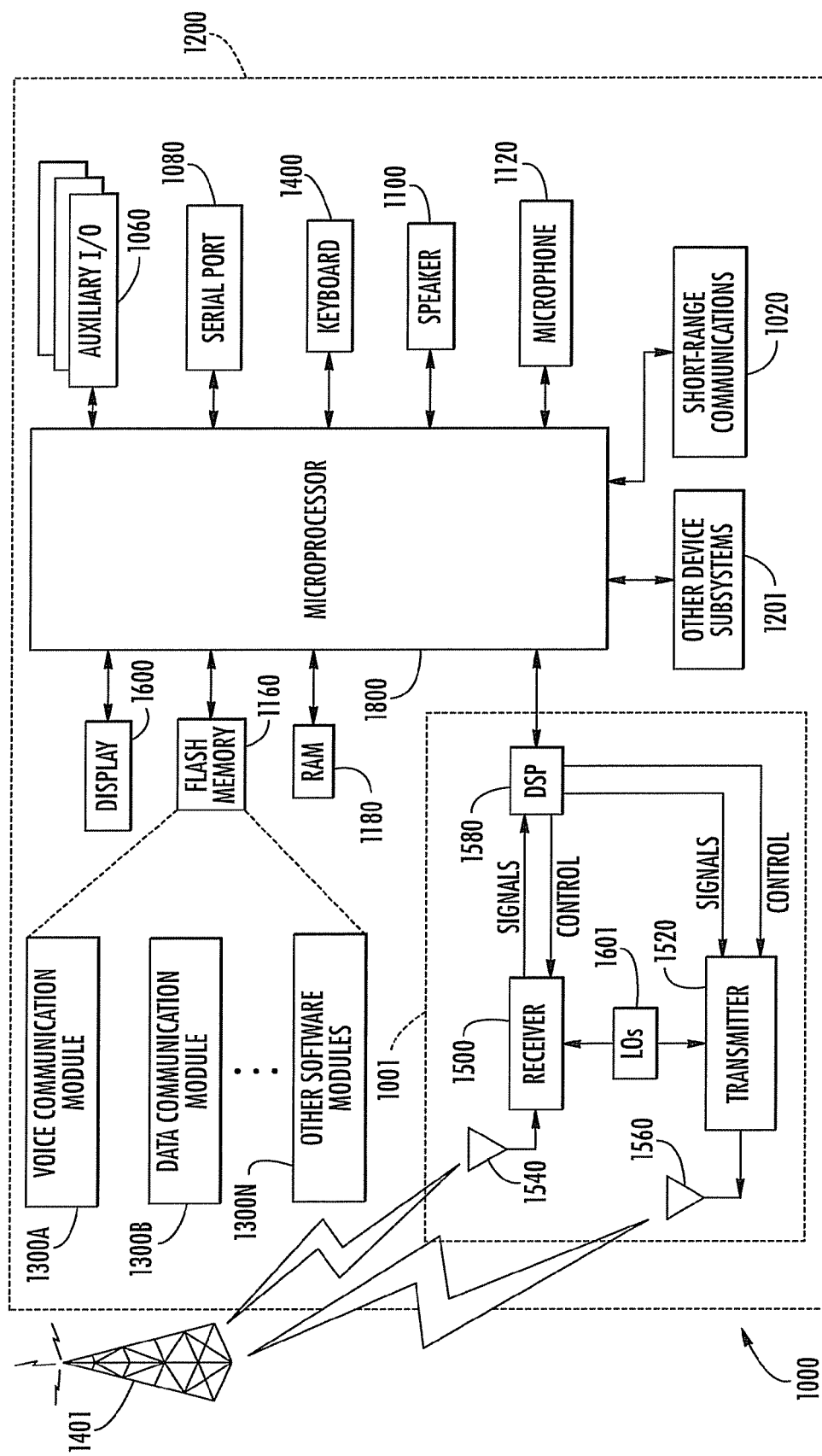
FIG. 6 is a schematic block diagram illustrating example components of a mobile wireless communications device that may be used in accordance with the present disclosure.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3G, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, track ball, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other example embodiments of the present disclose will come to the mind of one skilled in the art having the benefit of the teachings presented in the foregoing descriptions and the associated drawings. Therefore, it is understood that the disclosure is not to be limited to the specific example embodiments disclosed, and that modifications and example embodiments are intended to be included within the scope of the appended claims.

That which is claimed is:

1. A mobile wireless communications device comprising:
   a wireless transceiver;
   at least one audio transducer; and
   a controller cooperating with the wireless transceiver and the at least one audio transducer, and configured to
   convert speech input through the at least one audio transducer to converted text,
   determine a proposed modification for the converted text, wherein the proposed modification comprises a proposed ambiguity resolution,
   output from the at least one audio transducer the proposed modification for the converted text, and
   wirelessly transmit the converted text via the wireless transceiver based upon a spoken command.

2. The mobile wireless communications device according to claim 1 wherein the proposed modification comprises a proposed grammar correction.

3. The mobile wireless communications device according to claim 1 wherein said controller is configured to accept or reject the proposed modification for the converted text based upon a further speech input.

4. The mobile wireless communications device according to claim 1 wherein said controller is configured to selectively play back the converted text.

5. The mobile wireless communications device according to claim 1 further comprising a memory; and wherein said controller also cooperates with said memory to store the converted text.

6. The mobile wireless communications device according to claim 1 further comprising a memory coupled to said controller for storing text modification rules.

7. A mobile wireless communications device comprising:
a wireless transceiver;
at least one audio transducer; and
a controller cooperating with the wireless transceiver and the at least one audio transducer, and configured to
convert speech input through the at least one audio transducer to converted text,
determine a proposed modification for the converted text, wherein the proposed modification comprises a proposed ambiguity resolution,
output from the at least one audio transducer the proposed modification for the converted text,
accept or reject the proposed modification for the converted text based upon a further speech input, and
wirelessly transmit the converted text via the wireless transceiver based upon a spoken command.

8. The mobile wireless communications device according to claim 7 wherein the proposed modification comprises a proposed grammar correction.

9. The mobile wireless communications device according to claim 7 wherein said controller is configured to selectively play back the converted text.

10. The mobile wireless communications device according to claim 7 further comprising a memory; and wherein said controller also cooperates with said memory to store the converted text.

11. The mobile wireless communications device according to claim 7 further comprising a memory coupled to said controller for storing text modification rules.

12. A method of upgrading a mobile wireless communications device comprising a wireless transceiver, at least one audio transducer, and a controller cooperating with the wireless transceiver and the at least one audio transducer, the method comprising:
configuring the controller to cooperate with the at least one audio transducer to
convert speech input through the at least one audio transducer to converted text,
determine a proposed modification for the converted text, wherein configuring the controller to determine the proposed modification comprises configuring the controller to determine a proposed ambiguity resolution,
output from the at least one audio transducer the proposed modification for the converted text to thereby upgrade the mobile wireless communications device, and
wirelessly transmit the converted text via the wireless transceiver based upon a spoken command.

13. The method according to claim 12 wherein configuring the controller to determine the proposed modification comprises configuring the controller to determine a proposed grammar correction.

14. The method according to claim 12 wherein configuring the controller further comprises configuring the controller to accept or reject the proposed modification for the converted text based upon a further speech input.

15. The method according to claim 12 wherein configuring the controller further comprises configuring the controller to selectively play back the converted text.

* * * * *